3,230,187
PROCESS OF MANUFACTURING THERMOSETTING AMINOPLAST MOLDING COMPOSITION

Wilbur N. Oldham, Cheshire, Conn., assignor to American Cyanamid Company, Stamford, Conn., a corporation of Maine
No Drawing. Filed June 1, 1962, Ser. No. 199,274
6 Claims. (Cl. 260—6)

This invention relates to thermosetting aminoplast resin molding compositions. More specifically, this invention relates to an improved method of manufacturing thermosetting aminoplast resin molding compositions, and particularly melamine-formaldehyde molding compositions, which results in an increased rate of production with less criticality in drying conditions while also providing a more uniform final product.

Thermosetting aminoplast resin molding compositions of the type wherein a suitable filler, e.g., chopped α-cellulose, is impregnated with a thermosetting aminoplast resinous reaction product, e.g., a melamine-formaldehyde resin, are used extensively in the preparation of decorative molded articles such as dinnerware, home appliances and utensils, telephone handsets, and the like, where durability and good decorative appearance are prime consumer requirements.

The customary methods of manufacturing such molding compositions generally involve the separate steps of impregnating a fibrous filler with the aminoplast resin, drying the impregnated material to a low volatile content, then grinding and milling the dried material to convert it to a fine, fluffy powder, and finally densifying and granulating the powdered material.

Considering this sequence of steps in greater detail, a given quantity of filler and the required amount of the aminoplast resin in syrup form are first charged to a mechanical mixer and mixed until the desired degree of impregnation is attained. Ordinarily, from about 23% to about 30% by weight, based on the total weight of resin and filler, of the filler, and correspondingly from about 70% to about 77% by weight, also based on the total weight of resin and filler, of the resin, both weights being calculated on a dry basis, will be employed. Various commonly employed additives, such as pigments, curing catalysts, mold lubricants, and the like, may be added during this impregnation step and homogeneously dispersed throughout the composition. However, the more prevalent practice is to incorporate these additives immediately before or during the subsequent grinding and milling step.

Once the filler has been suitably impregnated, it is then dried, e.g., by oven-drying, to a low volatile content, usually in the order of about 10% or less. The dried material leaves the oven in a coarse granular form, which is generally referred to in the art as "popcorn." At this point the additives mentioned above are generally added to the "popcorn," and the composite material is then comminuted, i.e., ground and milled, and homogeneously blended, preferably in a single operation.

This grinding, milling and blending, the essential purpose of which is to comminute the "popcorn" to a fine particle size, e.g., in the order of from about 50 to about 200 microns, while at the same time uniformly dispersing the aforementioned additives, and particularly the pigment, therein, is commonly carried out in one step by ball milling the composite material. A ball mill is a rotatable, drum-like apparatus which is filled to a depth of between about one-third and two-thirds of its diameter with a charge of flint or porcelain balls, or the like, of varying diameters. The material to be comminuted fills the interstices between the balls and part of the free space above them. As the ball mill rotates the balls are set in motion, and a substantial portion of the composite material and balls rises along the wall of the drum and then cascades over the remaining portion of the charge, an action which is unique in that it permits grinding, milling and blending to take place all at the same time.

The composite material leaves the ball mill in the form of a fine, fluffy powder possessing a bulk density in the order of 0.35 gram per cubic centimeter or less. It is then usually densified, for example by forceable deaeration at ambient room temperatures as disclosed in U.S. Patent No. 3,007,885 to Oldham et al., and granulated to convert it to the form most suited to the usual commercial molding operations.

Undoubtedly one of the most critical points in the above-described manufacturing sequence, and one which presents the greatest practical difficulties, is the drying operation. One common method of removing water from the wet, resin-impregnated filler essentially involves one step. A stream of dry air, heated to a temperature below that at which the resin content of the material will substantially advance in cure, is passed through a bed or cake of the wet, resin-impregnated filler until the desired volatile content is reached. Another frequently employed method involves the use of a continuous drying oven, e.g., a multistage drying oven wherein the impregnated filler progresses on an endless belt through zones of progressively decreasing temperature. However, in either of these methods, and for that matter in any drying step, the conditions of temperature and humidity in the drier must be closely controlled so as to effect the required degree of drying without advancing the degree of polymerization of the resin to the point at which the resin is considerably advanced towards the thermoset state and thus can no longer be satisfactorily cured in a subsequent molding operation. It has been found from experience that it is difficult to maintain such close controls in the drier when drying the conventional resin-impregnated filler and at the same time maintain a commercially satisfactory production rate. Consequently, when using the conventional manufacturing method outlined above it is difficult to maintain uniformity in the product with respect to the degree of polymerization of its resinous component from batch to batch and even within an individual batch. In addition, the relatively large proportion of resin in a conventional batch of wet, resin-impregnated filler necessarily limits the output of any drying oven.

The present invention provides an efficient method of overcoming each of the aforementioned difficulties. I have now discovered that by impregnating the filler with only part of the required amount of thermosetting aminoplast resin in syrup form, drying this partially impregnated material to the desired volatile content, adding the remainder of the required amount of thermosetting aminoplast resin in substantially dry form to the dried, partially impregnated filler, and comminuting and homogeneously blending this composite material, the temperature and humidity conditions in the drier when drying the partially impregnated filler need not be as closely controlled as in the prior art practice, the rate of production of thermosetting aminoplast resin molding composition can be materially increased, and a more uniform final product, in terms of the degree of polymerization of its resinous component, can be obtained.

It is, therefore, an object of my invention to provide an improved method of manufacturing thermosetting aminoplast resin molding compositions, such as melamine-formaldehyde molding compositions.

It is also an object of my invention to provide an improved method of manufacturing thermosetting aminoplast resin molding compositions, and particularly melamine-formaldehyde molding compositions, which results in an increased rate of production with less criticality in drying conditions while also providing a more uniform final product.

These and other objects of my invention will be discussed more fully hereinbelow.

In practicing the present invention, the amount of thermosetting aminoplast resin used to impregnate the filler to provide part of the required resin content can range from about 40% to about 66% by weight, preferably from about 50% to about 65% by weight, calculated on a dry basis, based on the total weight of the dried, partially impregnated filler, i.e., the total weight of resin and filler prior to the addition of the remainder of the thermosetting aminoplast resin. The resin will be used in the form of a resin syrup, which can be admixed with the filler by any of the means known in the art, e.g., in a mechanical mixer. The wet, resin-impregnated filler is then dried under conventional drying conditions, e.g., at a temperature of from about 170° F. to about 190° F. dry bulb and from about 100° F. to about 125° F. wet bulb, until it reaches a volatile content of less than about 10%, e.g., a volatile content of from about 4% to about 6%. The remainder of the resin content of the thermosetting aminoplast resin molding composition is added as substantially dry resin to the dried, resin-impregnated filler in an amount sufficient to provide a total resin content in said molding composition ranging from about 70% to about 77% by weight, calculated on a dry basis, based on the total weight of resin and filler in said molding composition. The substantially dry resin will preferably be added in toto just before the grinding, milling and blending step is begun. However, part of the substantially dry resin may be added before the grinding, milling and blending step and the rest added during this step, or all of it may be added after the grinding, milling and blending of the dried, partially impregnated filler has begun.

The principal class of thermosetting aminoplast resins which can be employed in preparing molding compositions according to the practice of the present invention encompasses thermosetting aminotriazine-aldehyde resins. resins of this type, as well as techniques for their preparation, are well known in the art, as shown for example in U.S. Patents Nos. 2,197,357 to Widmer et al. and 2,260,239 to Talbot. These conventional thermosetting aminotriazine-aldehyde resins are synthetic resins wherein one or more aminotriazines containing at least two amidogen groups, each having at least one aldehyde-reactable hydrogen atom attached to the amidogen nitrogen atom, e.g., melamine, have been reacted with an aldehyde, such as formaldehyde, to yield a potentially thermoset resinous condensate, i.e., one which has been carried to an intermediate stage of condensation whereby it remains as a resinous material soluble or readily dispersible in aqueous systems while also remaining capable of being converted, under suitable conditions of heat and pressure, to a substantially insoluble and infusible form.

Melamine is the preferred aminotriazine reactant for preparing the heat-curable or potentially heat-curable partially polymerized aminotriazine-aldehyde resinous reaction products which are employed in the practice of the present invention, but other aminotriazines, e.g., mono-, di- and tri-substituted melamines, such as the mono-, di- and trimethylemelamines, and the like; guanamines, such as formoguanamine, acetoguanamine, benzoguanamine, and the like, as well as mixtures of aminotriazines, may also be utilized as reactants. Similarly, formaldehyde, either as such or as an aqueous solution, is the preferred aldehyde reactant, but other aldehydes, e.g., acetaldehyde, propionaldehyde, butyraldehyde, benzaldehyde, and the like, or compounds engendering aldehydes, e.g., paraformaldehyde, hexamethylenetetramine, and the like, may also be employed. The properties desired in the finished product and economic considerations are among the elements which will determine the choice of the particular aminotriazine and aldehyde employed.

The mol ratio of aldehyde to aminotriazine in the resinous reaction product is not critical, and may be within the order of from about 1:1 to about 4:1, respectively, depending on the nature of the starting materials and the characteristics desired in the final product, but it is preferred that the mol ratio of aldehyde to aminotriazine be within the order of from about 1.5:1 to about 3:1, respectively.

Conventional reaction conditions are observed in preparing the thermosetting aminotriazine-aldehyde resin. Thus, the aldehyde and aminotriazine may be heat-reacted at temperatures ranging from about 40° C. to reflux temperature, i.e., about 100° C., for periods of time ranging from about 30 to about 120 minutes, at a pH ranging from about 7 to about 10, preferably in aqueous medium. Any substance yielding an alkaline aqueous solution may be used to effect alkaline reaction conditions, for example, alkali metal or alkaline earth metal oxides, hydroxides or salts with weak acids, e.g., sodium, potassium or calcium hydroxide or sodium or potassium carbonate. Mono-, di- or trialkylamines, e.g., triethanolamine, alkaline polyamines or polyalkaline polyamines, e.g., 3,3'-iminobispropylamine and the like, may also be used to effect alkaline reaction conditions. When necessary, acidic substances such as hydrochloric acid, sulfuric acid, phosphoric acid, acetic acid, or salts thereof may also be employed to regulate the pH.

Other amino, imino, amido or imido compounds having at least two aldehyde-reactable hydrogen atoms attached to amidogen nitrogen atoms besides the aminotriazines may be reacted with an aldehyde such as formaldehyde to provide the thermosetting aminoplast resins used in the practice of the present invention. Among these amidogen compounds are especially included urea and those of its derivatives which have been commonly used either by themselves or in combination with an aminotriazine such as melamine in preparing thermosetting aminoplast resinous compositions, such as for example the alkylureas, e.g., mono- and dimethyl-urea, haloureas, and the like.

As in common practice, the syrup containing one or more of the aforementioned aminoplast resins used to impregnate the filler will preferably be an essentially aqueous syrup having a resin solids content of from about 50% to about 70%, and preferably from about 55% to about 60%. However, any required amount of a lower alkanol, such as ethanol, isopropanol, and the like, e.g., amounts ranging from about 10% to about 50% by weight of the total amount of solvent present, may be employed if necessary, e.g., in the case of a benzoguanamine-formaldehyde resin, to effect solution of the resin. Furthermore, resin syrups having resin solids contents above or below the above-stated range may also be employed, if desired, to effect the required degree of impregnation.

The substantially dry resin admixed with the dried, resin-impregnated filler will generally be prepared from an aqueous syrup of the same resin used to partially impregnate the filler, using any suitable means, such as spray drying, tray drying, kettle drying, drum drying, and the like to dry the resin. The dried resin ordinarily will have a moisture content of less than about 2%, e.g., a moisture content ranging from about 0.2% to about 1% by weight, based on the total weight of the dried resin.

If desired, a curing catalyst may be added to the molding composition, preferably by incorporating it in the substantially dry resin prior to the addition of said resin to the dried, resin-impregnated filler. Among the many curing catalysts known in the art are mineral acids, such as phosphoric acid and the like, organic acids, such as phthalic acid and its anhydride, p-toluenesulfonic acid, benzene sulfonic acid, acid salts, such as magnesium bromide, and mixtures thereof with amines such as triethanolamine, mixtures of acids such as acetic acid with alkyl alkylol amines such as diethylethanolamine, and the like. These curing catalysts may be employed in amounts ranging from about 0.05% to about 0.5% by weight, based on the total weight of the thermosetting aminoplast resin molding composition.

The properties of the ultimately produced thermoset molded articles can be modified, if desired, by incorporating various other substances besides curing catalysts with the substantially dry resin prior to its addition to the dried, resin-impregnated filler. Included among such substances are plasticizers such as the α-alkyl-D-glucosides, e.g., α-methyl-D-glucoside, disclosed in U.S. Patent No. 2,773,848 to Lindenfelser, methylol derivatives corresponding to the general formula:

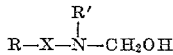

wherein R represents an alkyl, aryl or aralkyl group, R' represents a hydrogen atom or an alkyl, alkylol, aryl or acyl group, and X represents

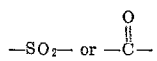

e.g., N-methylol p-toluenesulfonamide (which may be formed in situ by the addition of p-toluenesulfonamide to an amidogen-formaldehyde reaction mixture), and the like, or combinations of these glucosides and methylol derivatives, e.g., a mixture of α-methyl-D-glucoside and p-toluenesulfonamide, as disclosed in U.S. Patent No. 2,773,788 to Magrane et al.

The substantially dry resin added to the dried, resin-impregnated filler need not be the same resin as that used to partially impregnate the filler. For example, two different aminoplast resins, e.g., a melamine-formaldehyde resin and a urea-formaldehyde resin, can be employed. A further variation would involve the use of two aminoplast resins which are each prepared from the same amidogen compound and aldehyde but which have different mol ratios of amidogen compound to aldehyde. Similarly, the aforementioned additives need not be incorporated in the substantially dry resin prior to its addition to the dried, resin-impregnated filler, but may, if desired, be added to the dried, resin-impregnated filler either before, with or subsequent to the addition of the substantially dry resin thereto.

The filler employed in thermosetting aminoplast resin molding compositions prepared according to the practice of the present invention can be any of the materials known to the prior art for this purpose. Especially suitable are fibrous fillers such as α-cellulose, regenerated cellulose or other cellulosic fibers, asbestos fibers, fiberglass, yarn cuttings, and a variety of cloth cuttings, such as those from silk, rayon, nylon, linen or cotton cloth or from cloth made from glass fibers or from other synthetic fibers such as homo- or copolymeric acrylonitrile fibers, and the like. Particulate fillers, such as wood flour, walnut shell flour, mica, sand, ground cork, and the like, may be substituted in whole or in part for a fibrous filler if the degree of decorative quality sought in the final molded article so permits. The presence of a filler, and particularly a fibrous filler, in molded articles prepared from thermosetting aminoplast resins obviates the inherent cracking and crazing tendencies of the thermoset resin and, additionally, contributes to the mechanical strength of the articles.

Just as in the case of the thermosetting aminoplast resin, the curing catalyst and the filler, the mold lubricants, dyes, pigments, and the like employed in thermosetting aminoplast resin molding compositions prepared according to the practice of the present invention can be any of the materials known to the prior art for this purpose. For example, zinc stearate, glyceryl monostearate and the like can be employed as mold lubricants in amounts ranging from about 0.25% to about 1% by weight, based on the total weight of the molding composition. Any or all of these additives can be added to the dried, resin-impregnated filler along with the substantially dry resin as well as prior to or following the addition of the substantially dry resin.

In order that those skilled in the art may more fully understand the inventive concept presented herein, the following examples are set forth. These examples are given solely by way of illustration and should not be considered as expressing limitations unless so set forth in the appended claims. All parts and percentages are by weight, unless otherwise stated.

*Example I*

A production batch of melamine-formaldehyde resin syrup (mol ratio formaldehyde:melamine=2:1, respectively) was prepared by heat-reacting 2,685 parts of a 44% aqueous solution of formaldehyde and 2,496 parts of melamine in the presence of 1.96 parts of triethylamine (buffer) to a hydrophobe of 10%–12% solids.

After cooling to about 25° C., 2,590 parts of this resin syrup and 990 parts of cut α-cellulose filler were charged to a pre-warmed mechanical mixer. This charge of resin syrup and filler amounted to 65% melamine-formaldehyde resin and 35% α-cellulose, calculated on a dry basis. The charge was mixed for 25 minutes at 135° F., following which the wet mix was dascharged from the mixer and fed to the endless belt of a standard 4 zone circulating air-type dryer, wherein dry bulb temperatures of 176° F. and wet bulb temperatures of 119° F. were maintained. The wet, resin-impregnated filler was deposited on the belt to a thickness of 3½ inches, and the dryer was operated at a rate such that 4,400 parts per hour of dried material were collected. The dried, resin-impregnated filler had a volatile content of 5.0%–5.4%, as determined by heating samples for twenty minutes at 150° C.

3,065 parts of the dried, resin-impregnated material and 835 parts of spray dried melamine-formaldehyde resin (mol ratio formaldehyde:melamine=2:1, respectively), having a moisture content of 0.5%, together with appropriate amounts of phthalic anhydride (curing catalyst), zinc stearate (mold lubricant) and pigments, were charged to a ball mill and ground for 6 hours to give a fine, fluffy powder having a bulk density of about 0.25 g./cc. This powder was then densified and granulated according to the procedure of Example 1 of U.S. Patent No. 3,007,885 to give a granular molding composition having a bulk density of 0.60–0.65 g./cc., 90% of which was retained on a +80 mesh screen. This granular molding composition gave more uniform molded articles, in terms of their physical properties and appearance, than could be obtained from a conventional granular molding composition prepared from the same materials in the same proportions but using all of the melamine-formaldehyde resin in syrup form to impregnate the filler. In addition, since 835 parts of substantially dry resin were ball milled with 3,065 parts of dried, partially impregnated filler, the effective increase in dryer capacity was $$\frac{835}{3,065} \times 100$$

or approximately 27%, which also provided a significant increase in the rate of production.

*Example II*

The procedure of Example I was repeated in every detail except for the following. The amounts of melamine-formaldehyde resin syrup and α-cellulose filler charged to the pre-warmed mixer were 1,394 parts and 990 parts, respectively. After mixing for the required time and then drying at the stated temperature conditions, 1,980 parts of the dried, resin-impregnated filler was charged, together with 1,620 parts of the spray-dried melamine-formaldehyde resin and the remaining additives to the ball mill. Thus, with 1,620 parts of substantially dry resin being ball milled with 1,980 parts of dried, partially impregnated filler, the effective increase in dryer capacity was $$\frac{1,620}{1,980} \times 100$$

or approximately 82%.

It will be obvious to those skilled in the art that other changes and variations may be made in carrying out the present invention without departing from the spirit and scope thereof as defined in the appended claims.

I claim:
1. A method of manufacturing a thermosetting aminoplast resin molding composition which comprises:
    (1) impregnating a filler with 40 to 60 percent of the required amount of a thermosetting aminoplast resin of the aminotriazine-aldehyde type in syrup form to give a partially impregnated filler,
    (2) drying at a temperature below that at which the resin content of the material will substantially advance in cure said partially impregnated filler to a volatile content of less than about 10%,
    (3) adding the remainder of the required amount of thermosetting aminoplast resin as substantially dry resin to the dried, partially impregnated filler to give a composite material, and
    (4) comminuting and homogeneously blending said composite material.

2. A method of manufacturing a thermosetting aminoplast resin molding composition which comprises:
    (1) impregnating a filler with 40 to 66 percent of a thermosetting melamine-formaldehyde resin in syrup form to give a partially impregnated filler,
    (2) drying at a temperature below that at which the resin content of the material will substantially advance in cure said partially impregnated filler to a volatile content of less than about 10%,
    (3) adding the remainder of the required amount of thermosetting melamine-formaldehyde resin as substantially dry resin to the dried, partially impregnated filler to give a composite material, and
    (4) comminuting and homogeneously blending said composite material.

3. A method of manufacturing a thermosetting aminoplast resin molding composition which comprises:
    (1) impregnating a filler with a thermosetting aminoplast resin of the aminotriazine-aldehyde type in syrup form to give a partially impregnated filler having a resin content ranging from about 40% to about 66% by weight, calculated on a dry basis, based on the total weight of said partially impregnated filler,
    (2) drying at a temperature below that at which the resin content of the material will substantially advance in cure said partially impregnated filler to a volatile content of less than about 10%,
    (3) adding the remainder of the required amount of thermosetting aminoplast resin as substantially dry resin having a moisture content of less than about 2% to the dried, partially impregnated filler to give a composite material, having a resin content ranging from about 70% to about 77% by weight, calculated on a dry basis, based on the total weight of said molding composition, and
    (4) comminuting and homogeneously blending said composite material.

4. A method of manufacturing a thermosetting aminoplast resin molding composition which comprises:
    (1) impregnating a filler with a thermosetting melamine-formaldehyde resin in syrup form to give a partially impregnated filler having a resin content ranging from about 40% to about 66% by weight, calculated on a dry basis, based on the total weight of said partially impregnated filler,
    (2) drying at a temperature below that at which the resin content of the material will substantially advance in cure said partially impregnated filler to a volatile content of less than about 10%,
    (3) adding the remainder of the required amount of thermosetting melamine-formaldehyde resin as substantially dry resin having a moisture content of less than about 2% to the dried, partially impregnated filler to give a composite material, having a resin content ranging from about 70% to about 77% by weight, calculated on a dry basis, based on the total weight of said molding composition, and
    (4) comminuting and homogeneously blending said composite material.

5. A method of manufacturing a thermosetting aminoplast resin molding composition which comprises:
    (1) impregnating a filler with a thermosetting aminoplast resin in syrup form to give a partially impregnated filler having a resin content ranging from about 50% to about 65% by weight, calculated on a dry basis, based on the total weight of said partially impregnated filler,
    (2) drying at a temperature below that at which the resin content of the material will substantially advance in cure said partially impregnated filler to a volatile content of less than about 10%,
    (3) adding the remainder of the required amount of thermosetting aminoplast resin as substantially dry resin having a moisture content of less than about 2% to the dried, partially impregnated filler to give a composite material, having a resin content ranging from about 70% to about 77% by weight, calculated on a dry basis, based on the total weight of said molding composition, and
    (4) comminuating and homogeneously blending said composite material.

6. A method of manufacturing a thermosetting aminoplast resin molding composition which comprises:
    (1) impregnating a filler with a thermosetting melamine-formaldehyde resin in syrup form to give a partially impregnated filler having a resin content ranging from about 50% to about 65% by weight, calculated on a dry basis, based on the total weight of said partially impregnated filler,
    (2) drying at a temperature below that at which the resin content of the material will substantially advance in cure said partially impregnated filler to a volatile content of less than about 10%,
    (3) adding the remainder of the required amount of thermosetting melamine-formaldehyde resin as substantially dry resin having a moisture content of less than about 2% to the dried, partially impregnated filler to give a composite material, having a resin content ranging from about 70% to about 77% by weight, calculated on a dry basis, based on the total weight of said molding composition, and
    (4) comminuating and homogeneously blending said composite material.

References Cited by the Examiner
UNITED STATES PATENTS

| | | | |
|---|---|---|---|
| 1,996,757 | 4/1935 | Elbel | 260—17.2 |
| 3,007,885 | 11/1961 | Oldham et al. | 260—39 |

WILLIAM H. SHORT, *Primary Examiner.*

JAMES A. SEIDLECK, *Examiner.*